(12) United States Patent
Goldin

(10) Patent No.: US 7,716,643 B2
(45) Date of Patent: May 11, 2010

(54) METHODS AND APPARATUS FOR SOFTWARE PROFILING

(75) Inventor: Maxim Goldin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1209 days.

(21) Appl. No.: 11/134,649

(22) Filed: May 20, 2005

(65) Prior Publication Data

US 2006/0265693 A1 Nov. 23, 2006

(51) Int. Cl.
*G06F 9/44* (2006.01)
(52) U.S. Cl. .................. 717/124; 717/130
(58) Field of Classification Search ............... None
See application file for complete search history.

(56) References Cited

U.S. PATENT DOCUMENTS

| | | | | |
|---|---|---|---|---|
| 6,079,032 | A * | 6/2000 | Peri | 714/38 |
| 6,282,701 | B1 * | 8/2001 | Wygodny et al. | 717/125 |
| 6,412,106 | B1 * | 6/2002 | Leask et al. | 717/124 |
| 6,658,649 | B1 * | 12/2003 | Bates et al. | 717/124 |
| 6,721,941 | B1 * | 4/2004 | Morshed et al. | 717/127 |
| 2006/0218533 | A1 * | 9/2006 | Koduru et al. | 717/124 |
| 2007/0006157 | A1 * | 1/2007 | Haraguchi et al. | 717/124 |
| 2007/0168984 | A1 * | 7/2007 | Heishi et al. | 717/124 |

* cited by examiner

Primary Examiner—Tuan Q Dam
Assistant Examiner—Hanh T Bui
(74) Attorney, Agent, or Firm—Wolf, Greenfield & Sacks, P.C.

(57) ABSTRACT

In one embodiment, a method is provided for use in a system which includes a target application, a profiler application and a debugging application, the profiler application being operative to attach to the target application and, upon attaching to the target application, performing operations to profile the target application, the debugging application being operative to monitor the target application. The method comprises attaching, by the profiler application, to the target application such that operations performed by the profiler application in profiling the target application are susceptible to monitoring by the debugging application. In one embodiment, the method further comprises generating helper code; transferring the helper code to the memory used by the target application; and causing the helper code to be executed from the memory used by the target application, wherein the helper code, when executed, causes the profiler agent library to be loaded to the memory used by the target application.

16 Claims, 4 Drawing Sheets

METHODS AND APPARATUS FOR SOFTWARE PROFILING

FIELD OF INVENTION

This invention relates generally to computer software, and more particularly to computer software which is used to gather information on the performance of other computer software.

BACKGROUND OF INVENTION

Profiler and debugging applications are computer programs which monitor and gather information on the performance of other applications (hereinafter target applications or target processes). A profiler application may collect information from a target application to assess its execution efficiency and/or performance. For example, a profiler may identify the time, processing resources and/or memory required by a particular portion of the target application for execution. Typically, information collected by the profiler application is analyzed to identify one or more portions of the target application which may be optimized or improved.

A debugging application is typically used to test a target application and find flaws, or "bugs", in its coded instructions. For example, when an application fails, a debugging application may be employed to identify the portion(s) (e.g., the coded routines) which caused it to do so.

In general, there are two types of profiler applications. One type, called a sampling profiler, operates by gathering data indicative of a target process's performance at predetermined intervals. A second type, called an instrumentation profiler, causes the target process to execute additional instructions provided by the profiler application to produce information indicative of the target process's performance. In general, a sampling profiler produces less specific information about a target process than an instrument profiler does, but a sampling profiler allows the target process to execute at nearly full speed. Because an instrument profiler may slow down a target process, it may produce skewed or inaccurate results.

A profiler application may operate either by creating (i.e., initiating) a target process, such that the profiling of the target process is started immediately upon initiation, or by attaching to an existing (i.e., executing) target process, such that profiling begins with the currently executing portion. A user of a profiler application may find it desirable to profile a created process if the user is unsure which portion(s) of the target process may require optimization, as creating the target process allows the profiler to gather data from the initiation of the target process. Conversely, a user may find it desirable to attach a profiler application to an existing process if a target process which had previously been functioning normally begins to run sub-optimally, so that information gathered by the profiler relates only to the portion executing poorly, and the user is not required to examine information on portions of the target process which ran normally.

When a sampling profiler application attaches to a target process, it typically allocates a specific portion of memory used by the target process, and loads a profiler agent to that allocated memory portion for execution. Because sampling profilers are designed to be unobtrusive, the target process is typically not notified that the profiler agent has been loaded to memory, or that functions enabled by the profiler agent will be initiated by the profiler application. Because of this, other applications designed to gather information on executing software applications, such as debugging applications, may not be able to gather information on the operation of the profiler agent. As such, profiler agents may be difficult to debug.

SUMMARY OF INVENTION

In one embodiment, a method is provided for use in a system comprising a target application, a profiler application and a debugging application, the profiler application being operative to attach to the target application and, upon attaching to the target application, performing operations to profile the target application, the debugging application being operative to monitor the target application. The method comprises an act of: (A) attaching, by the profiler application, to the target application such that operations performed by the profiler application in profiling the target application are susceptible to monitoring by the debugging application.

Another embodiment provides at least one computer-readable medium having instructions recorded thereon, the instructions, when executed, performing a method for use in a system comprising a target application, a profiler application and a debugging application, the profiler application being operative to attach to the target application and, upon attaching to the target application, performing operations to profile the target application, the debugging application being operative to monitor the target application. The method comprises an act of: (A) attaching, by the profiler application, to the target application such that operations performed by the profiler application in profiling the target application are susceptible to monitoring by the debugging application.

BRIEF DESCRIPTION OF DRAWINGS

The accompanying drawings are not intended to be drawn to scale. In the drawings, each identical or nearly identical component illustrated in the various figures is represented by a like numeral. For purposes of clarity, not every component may be labeled in every drawing. In the drawings.

DETAILED DESCRIPTION

Figure 1:
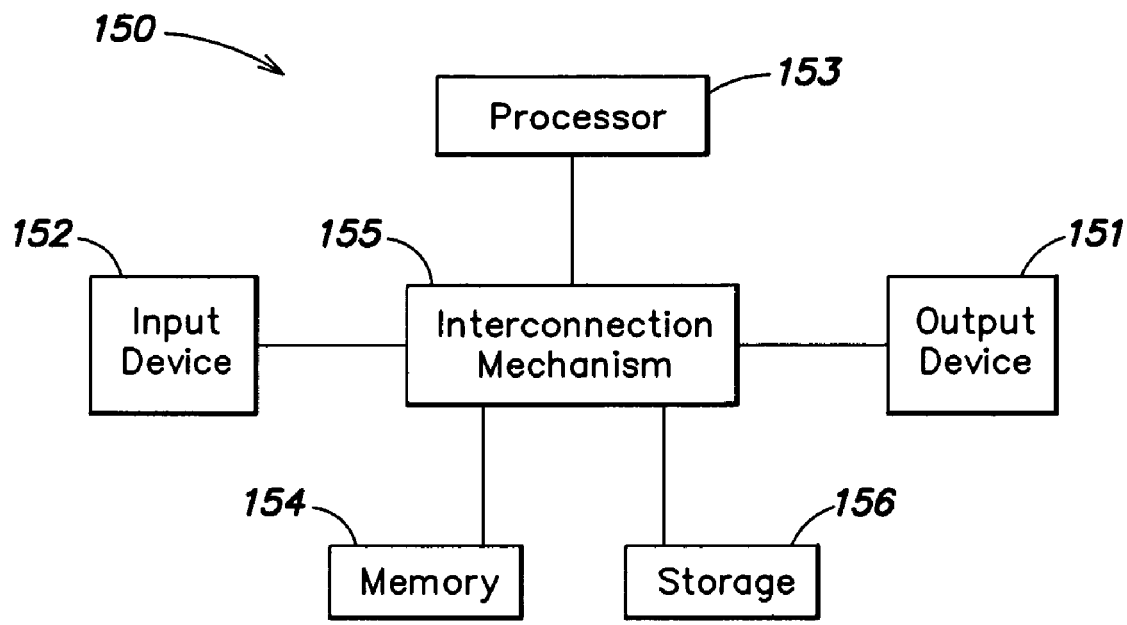
FIG. 1 is a block diagram of an exemplary computer system on which embodiments of the invention may be implemented.

In accordance with one embodiment of the invention, a method is provided for loading, or "injecting," a profiler agent into memory allocated to a target process, such that the profiler agent produces information which can be captured or monitored by an external entity, such as a debugging application. For example, in one embodiment, a profiler application may transfer helper code to memory allocated to the target process, and cause the helper code to be executed from the allocated target process memory. Executing the helper code from this memory location may make it appear to an external entity (e.g., a debugging application) that the target process itself executed the helper code, thereby making it appear to the external entity that the target process loaded the profiler agent to its memory (e.g., just as any other library linked by the target process during its execution). As a result, subsequent operations performed by the profiler agent may appear to the external entity to be part of the target process's operations. In monitoring the execution of the target process, the external entity may then be capable of monitoring the execution of the profiler agent. In one embodiment, the execution of the profiler agent remains transparent to the target process, such that the target process is not disturbed or modified by the loading or execution of the profiler agent.

In one embodiment, the profiler agent may be injected into an existing (i.e., executing) target process. Briefly, in accordance with this embodiment, a profiler application may establish control of the target process and allocate a portion of target process memory via any suitable technique (e.g., those which are well-known to skilled artisans), and then transfer (e.g., load) helper code and/or parameters to the allocated memory portion. The profiler application may then create a remote process thread, a technique which is well-known in the art, allowing the profiler application to execute the newly copied helper code from the target process memory. Execution of the helper code may cause the profiler agent library to be loaded to target process memory. The profiler application may then initiate functions supported by the profiler agent, as it would normally do to profile the target process. However, these functions may appear to external entities, such as debugging applications, as being performed by the target process. As a result, the functions performed by the profiler agent library may be debugged.

In one embodiment, a method is provided for injecting the profiler agent library into a created process. Briefly, in accordance with this embodiment, a profiler application may create the target process in a suspended mode, having a single process thread. The profiler application may allocate a portion of target process memory and copy helper code and/or parameters to the allocated memory portion, obtain the context for the suspended thread, and reset the context so that the thread includes a pointer to the newly copied code. The profiler application may then allow the target process such that the helper code is executed, thereby loading the profiler agent library to target process memory. The profiler may then reset the thread to its original context, and then allow the thread to resume, such that the target process begins with the profiler agent library having been loaded to its memory. Again, functions performed by the profiler agent may be monitored by a debugging application.

Various aspects of the invention may be implemented on one or more computer systems, such as exemplary computer system 150 shown in FIG. 1. Computer system 150 includes input device(s) 152, output device(s) 151, processor 153, memory system 154, and storage system 156, all of which are coupled, directly or indirectly, via interconnection mechanism 155, which may comprise a bus or switch. The input device(s) 152 may receive input from a user (e.g., a human operator) or machine, and the output device(s) 151 may display or transmit information to a machine (e.g., a liquid crystal display or LCD) or user.

Processor 153 executes a program, called an operating system, which controls the execution of other computer programs, and provides scheduling, input/output and other device control, accounting, compilation, storage assignment, data management, memory management, communication and data flow control. The processor and operating system collectively define the platform for which application programs and other computer programming languages are written.

Processor 153 may execute one or more programs to implement various functions, such as those which embody aspects of the invention. These programs may be written in a computer programming language such as a procedural programming language, object-oriented language, macro language, other language, or a combination thereof.

Figure 2:
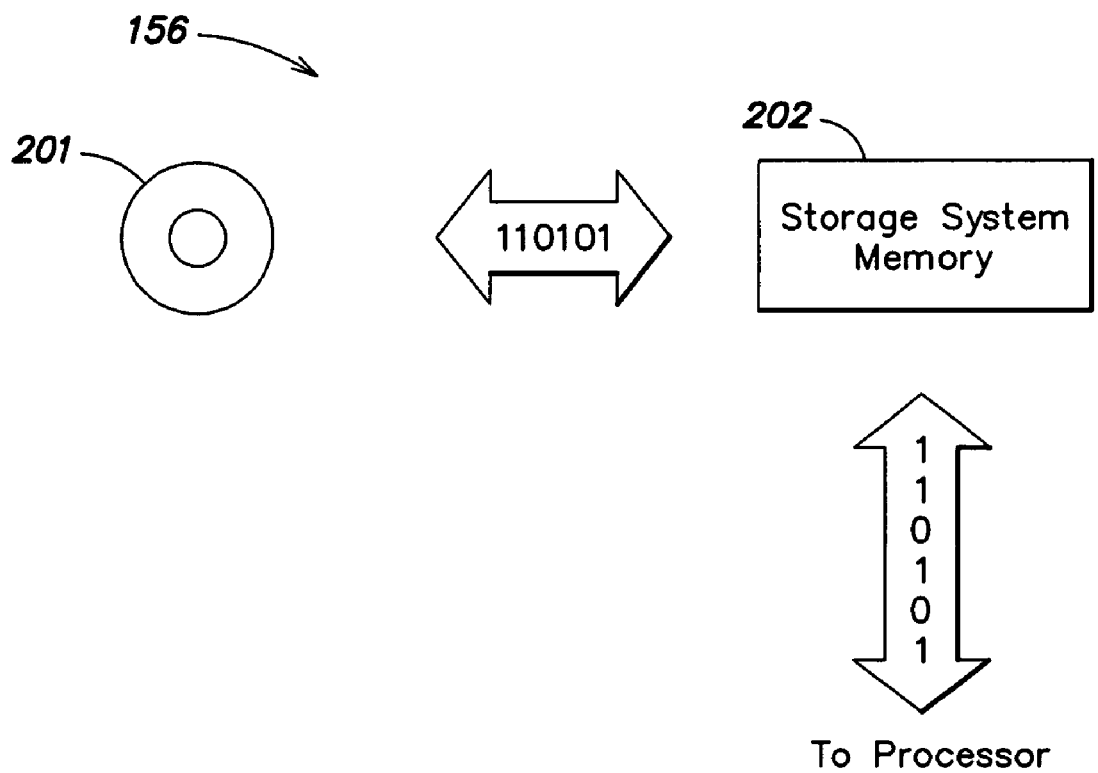
FIG. 2 is a block diagram of a storage system on which embodiments of the invention may be implemented.

Programs may be stored in storage system 156, which may hold information on a volatile or nonvolatile medium which may be fixed or removable. Storage system 156 is shown in greater detail in FIG. 2. It typically includes a computer-readable and -writable nonvolatile recording medium 201, on which signals are stored that define a program or information used by the program. The medium may, for example, be disk or flash memory. Typically, in operation, the processor 153 causes data to be read from a nonvolatile recording medium 201 into volatile memory 202 (e.g., a Random Access Memory, or RAM) that allows for faster access to the information by the processor 153 than does medium 201. Memory 202 may be located in storage system 156, as shown in FIG. 2, or in memory system 154, as shown in FIG. 1. Processor 153 generally manipulates data within the integrated circuit memory 154, 202 and then copies the data to the medium 201 after processing is completed. A variety of mechanisms are known for managing data movement between the medium 201 and the integrated circuit memory element 154, 202, and the invention is not limited thereto. The invention is also not limited to a particular memory system 154, or storage system 156.

Figure 3:
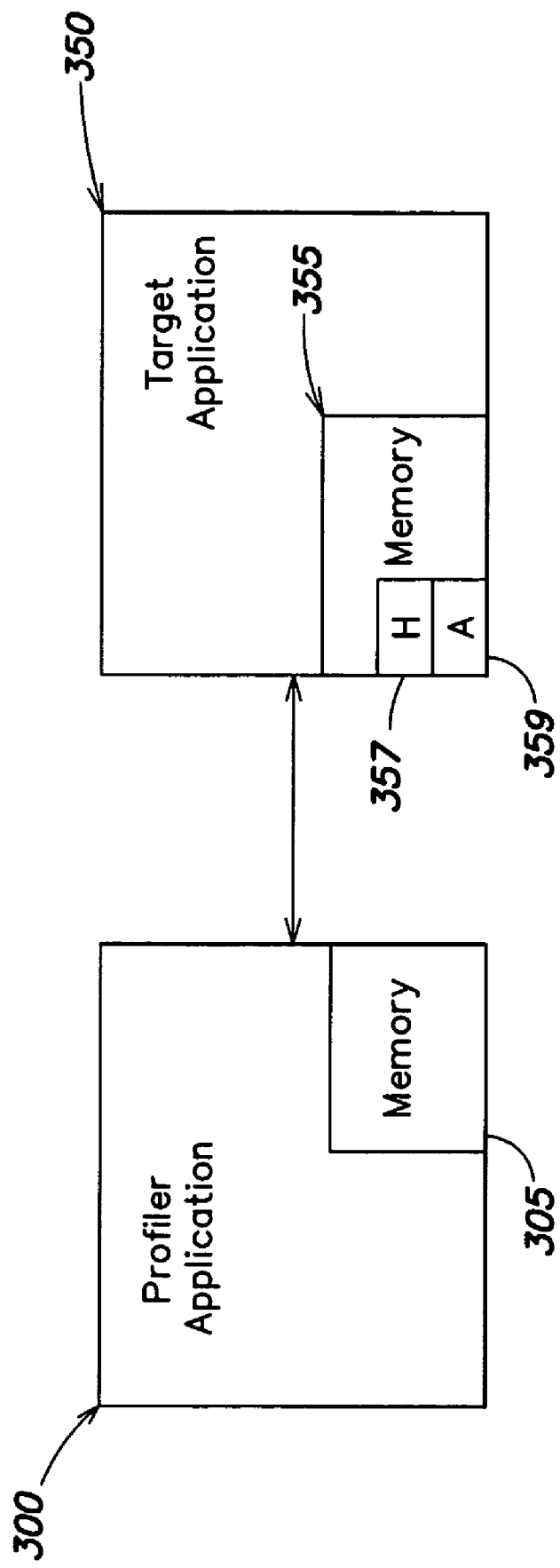
FIG. 3 is a block diagram providing a symbolic representation of a system comprising a profiler application and a target application, according to embodiments of the invention.

Exemplary components which may employ or implement embodiments of the invention are shown in FIG. 3. Profiler application 300 communicates with target process 350, using any suitable communication technique(s) and/or infrastructure. Profiler application 300 includes allocated memory 305. Target process 350 includes memory 355, which includes portions 357 and 359. The functions associated with each of the components shown in FIG. 3 are discussed in detail below, with reference to FIGS. 4 and 5.

Figure 4:
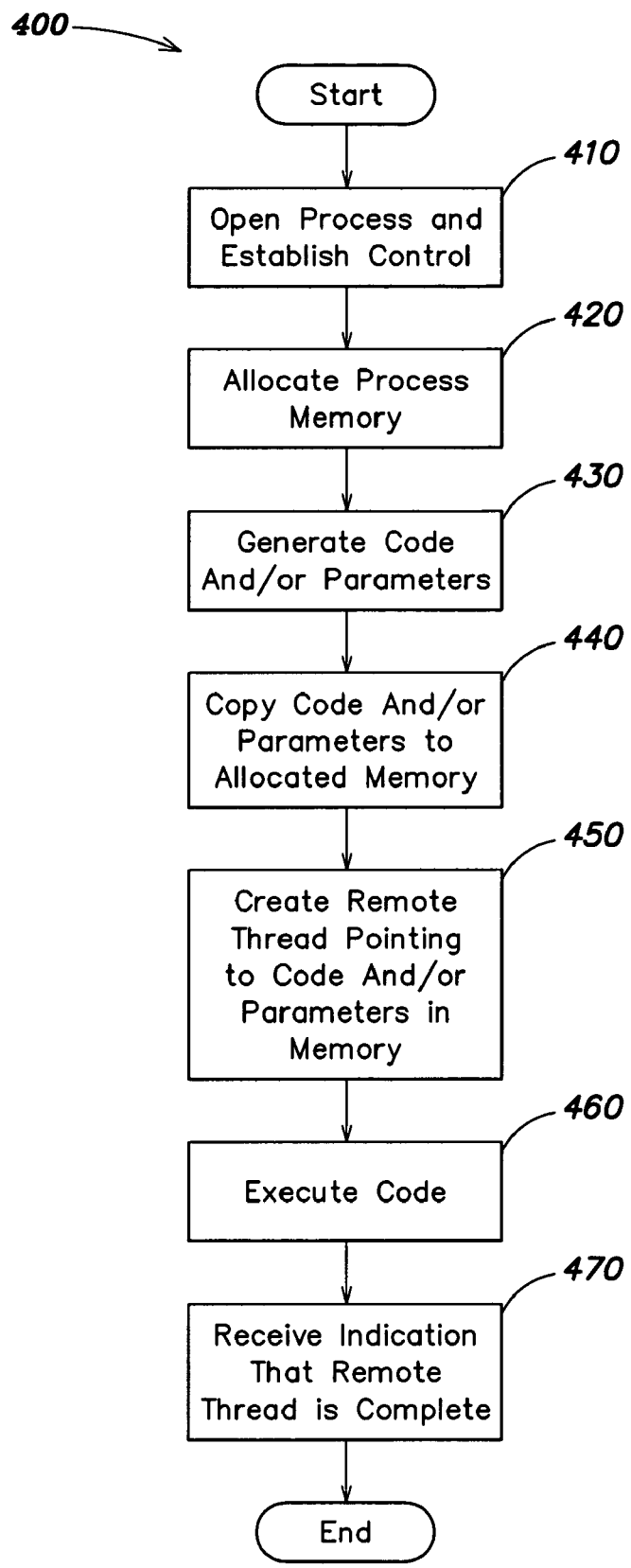
FIG. 4 is a flow chart depicting an exemplary technique for injecting a profiler agent into an existing target process, according to embodiments of the invention.

An exemplary process 400 by means of which a profiler agent library may be injected into an existing or executing target process (e.g., target process 350, FIG. 3) by a profiler application (e.g., profiler application 300) is depicted in FIG. 4. Upon the start of process 400, the profiler application opens the target process in act 410. In one embodiment, opening the target process involves conventional techniques which include establishing a point of control over the target process. However, the target process may be opened in any suitable manner. For example, in a processing environment which employs the Windows® operating system offered by Microsoft® Corporation of Redmond, Wash., the profiler application may issue an "OpenProcess" system call to the operating system which allows the profiler application to open the target process. In one embodiment, opening the target process does not interrupt its execution.

The process then proceeds to act 420, wherein the profiler application allocates a portion of memory (e.g., memory portion 357) used by target process 350. Again, this may be accomplished in any suitable manner, as the invention is not limited in this respect. For example, in a Windows® operating system environment, the profiler application may issue a "VirtualAlloc" system call to allocate a portion of target process memory. This technique is well-known to skilled artisans.

The process then proceeds to act 430, wherein the profiler application generates helper code and/or parameters. In one embodiment, the profiler application employs a linker, such as an integrated linker, to generate the helper code.

In one embodiment, the helper code includes one or more calls to procedures which are located in libraries that are known to always be loaded to the same memory region by each process or application which employs them. Knowing that the required libraries are always loaded to the same memory region allows the profiler application to simply generate the helper code and copy it to target process memory, such that the helper code will function properly when executed from target process memory. In a Windows® operating system environment, the helper code may include calls to functions located in the "kernel32.dll" and "ntdll.dll" libraries, as these libraries are known to be loaded to the same memory region by each process which employs them. Of course, these specific libraries need not be employed, as any programmed instruction may be employed. Further, it should be appreciated that the helper code need not employ libraries whose memory location is known. For example, the profiler application may first determine a memory region at which one or more required programmed instructions will be loaded by the target process before creating the helper code, or the helper code may simply include instructions for performing a desired function such that external libraries and/or functions need not be called or linked, or any other suitable technique may be employed. The invention is not limited in this respect.

The process continues in act 440, wherein the profiler application copies helper code and parameters generated in act 430 to the portion of target process memory allocated in the act 420 (using the example of FIG. 3, portion 357).

The process then proceeds to act 450, wherein the profiler application creates a remote thread which includes a pointer to the helper code and parameters copied in act 440. In act 460, wherein the helper code is executed via the remote thread within target process memory. In one embodiment, the execution of the helper code causes the profiler agent library to be loaded to portion 359 in target process memory 355. However, the profiler agent library, and/or any other suitable information, may be loaded to any desired location, as the invention is not limited in this respect.

Upon the completion of act 460, the process proceeds to act 470, wherein the profiler agent receives an indication that the remote thread has completed. In an embodiment wherein the remote thread executes under the Windows® operating system, upon completion of the execution of the thread, the thread is automatically terminated by the operating system. However, any suitable technique for terminating the thread may be employed. Process 400 then completes.

Upon the profiler application receiving an indication that the remote thread has completed, the profiler application "understands" that the profiler agent library has been injected into the target process, and that its functions may be invoked to profile the target process. As discussed above, because the profiler agent library is loaded to target process memory via code which is executed from within the target process memory, an appearance is created to external entities, such as debugging applications, that the target process loaded and linked the profiler agent library. Thus, when functions in the profiler agent library are invoked, the execution of these functions may be monitored by the external entities.

Exemplary helper code which may be employed to load a profiler agent library to the memory of an already-executing target process is shown in pseudo-code form below. Of course, any suitable programmed procedure for performing the above-described acts may be employed, as the invention is not limited in this regard.

```
DWORD ExecuteLoadLibrary(pData)
{
    SetDefaultValuesOfReturnData(pData);
    //
    // Load Library
    //
    pData->fnLoadLibraryW(pData->ModuleName);
    if(FAILED)
    {
        return 0;
    }
    UpdateValuesOfReturnData(pData);
    return 1;
};
```

The pseudo-code above is provided for illustrative purposes only and is not intended to be limiting.

Figure 5:
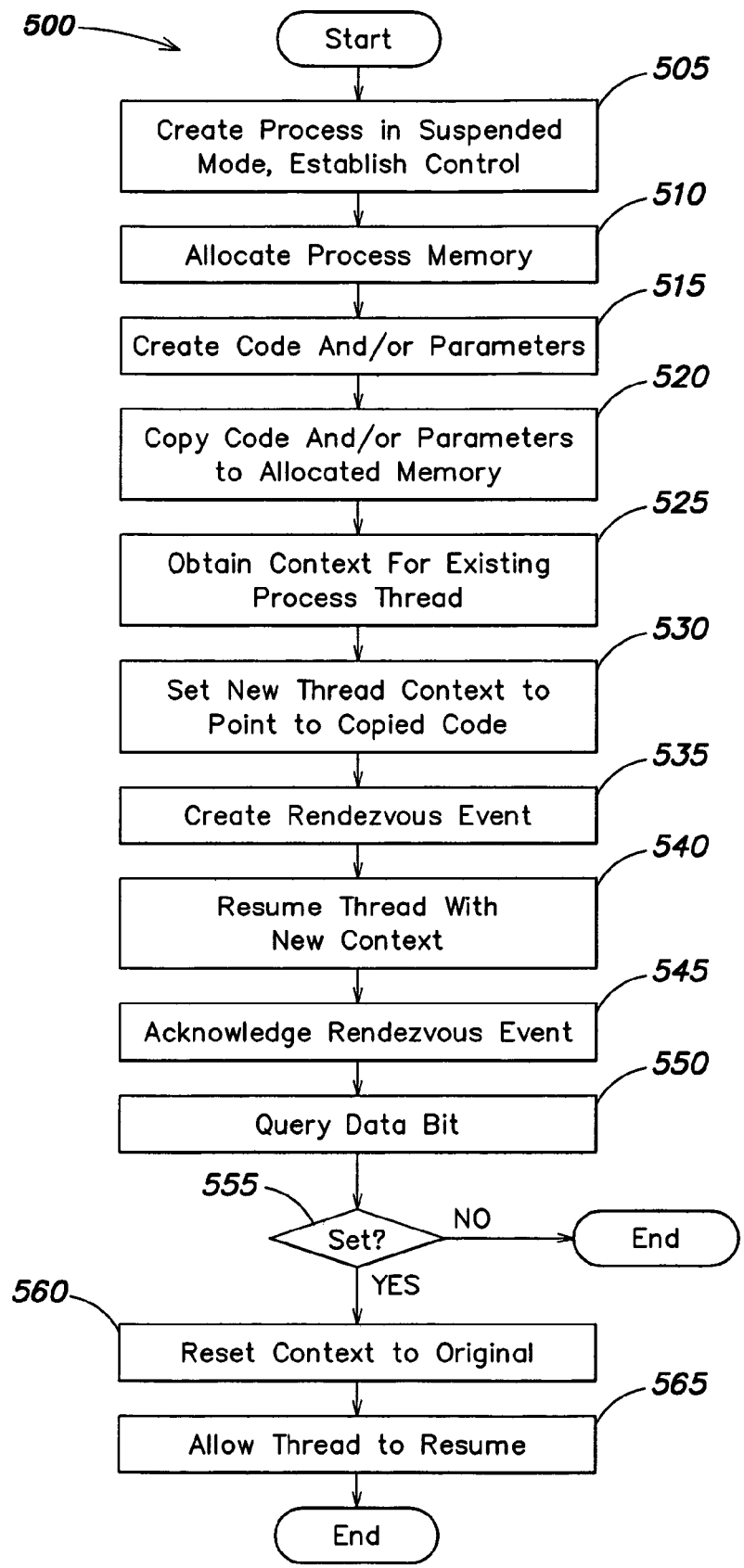
FIG. 5 is a flow chart depicting an exemplary technique for injecting a profiler agent into a created process, according to embodiments of the invention.

As discussed above, a profiler application may also attach to a target process which is not already executing, by creating the target process in order to begin profiling. An exemplary process 500 by means of which a profiling application may inject a profiler agent library into a created target process is shown in FIG. 5.

Upon the start of process 500, the profiler application may create, or initiate, a target process in suspended mode in act 505. Those skilled in the art will recognize that a process placed in suspended mode is in a frozen state, such that the process is prepared to execute but not allowed to do so. In one embodiment, the target process is created having a single process thread, although the invention is not limited in this respect. Given that the process is in suspended mode, the thread is suspended.

The process continues in act 510, wherein the profiler application allocates a portion of target process memory. This may be accomplished in any suitable manner, such as using the techniques described above with reference to FIG. 4.

The process then proceeds to act 515, wherein the profiler application generates helper code and parameters for loading to target process memory. Although this helper code may perform similar functions to those described above with reference to FIG. 4, it may perform additional or alternative functions as well. Exemplary functions performed by the helper code in various embodiments are described in detail below.

Upon the completion of act 515, the process proceeds to act 520, wherein the helper code and parameters are transferred to the allocated portion of target process memory. Using the example shown in FIG. 3, helper code may be transferred to memory portion 357. This transfer may be performed in any suitable manner, as the invention is not limited in this respect.

The process continues in act 525, wherein the profiler application obtains the context for the suspended process thread. In an embodiment wherein the target process executes under the Windows operating system, the profiler application may obtain the thread context by issuing a "GetThreadContext" call. However, the invention is not limited in this respect, as any suitable technique may be employed. In one embodiment, the context for the suspended process thread includes a pointer or other indication of the location of code which the thread was set to execute when the target process was created. In one embodiment, the profiler application records an indication of the thread's context in memory. This may be accomplished using any suitable technique. For example, in one embodiment the profiler application may record an indication of the thread's context in memory portion 305 (FIG. 3).

The process proceeds with act 530, wherein the profiler application sets a new context for the thread which includes a pointer to the helper code which was copied to target process memory in act 520. This may be accomplished via any suitable technique. For example, in an embodiment wherein the target process and profiler application execute under a Windows® operating system, the profiler application issues a "SetThreadContext" system call to reset the thread's context to point to the helper code.

The process then proceeds to act 535, wherein the profiler application modifies the suspended thread by adding a rendezvous event. Those skilled in the art will recognize that some operating systems which support threaded execution employ rendezvous events to provide an indication of the completion of a particular thread such that other threads waiting for the result of the thread may be resumed.

The process then continues in act 540, wherein the profiler application causes the suspended target process thread to be resumed with the newly established context (i.e., now including a pointer to the helper code). As a result, the target process thread causes the helper code to be executed by the target process, from its memory. As discussed above, the helper code causes the profiler agent library to be loaded to the target process memory.

In accordance with one embodiment, the helper code includes a portion which causes a predetermined bit within the target process memory to be reset (e.g., modified from '0' to '1') upon its successful completion. However, any suitable technique for providing an indication of successful completion of the helper code may be employed, as the invention is not limited in this respect.

In one embodiment, the helper code is configured to block itself into an endless loop upon completion (e.g., after setting the bit). This is because, as those skilled in the art will appreciate, a process having a single thread will be forced by the operating system to end upon the thread's completion. If the profiler application allowed the target process thread to complete upon executing the helper code, the target process would end, and obviously could not be profiled by the profiler application. Locking the helper code in an endless loop allows the thread, and thus the target process, to persist.

The process continues with act 545, wherein the profiler application acknowledges the occurrence of the rendezvous event which was created in act 535. This may be performed in any suitable manner, as the invention is not limited in this respect.

In act 550, the profiler application queries the data bit which was the helper code was configured to reset. In act 555, a determination is made as to whether the bit is reset (i.e., indicating that the helper code was executed successfully).

If it is determined that the bit is not reset, an indication may be provided to a user of the profiler application that the attempt to attach to the target process completed unsuccessfully, and the process completes. If it is determined that the bit was reset correctly, the process proceeds to act 560.

In act 560, the profiler application resets the context of the target process thread to its original context (i.e., the context in place before act 530 was completed). This may be accomplished in any suitable manner. For example, in an embodiment wherein the profiler application and/or target process execute under a Windows® operating system, the profiler application may issue a "SetThreadContext" system call to reset the thread's context. In one embodiment, the profiler application retrieves the indication of the context stored in act 525, and uses this information as a basis for resetting the thread's context. However, the invention is not limited in this respect, and any suitable technique may be employed.

Process 500 then proceeds to act 565, wherein the profiler application allows the thread to resume in its original context. This may allow the target process to begin. Again, because the profiler agent has been injected into target process memory, the operation of the profiler agent is visible to both the profiler application and a debugging application.

Exemplary helper code which may be employed to load a profiler agent library to the memory of a created target process in shown in pseudo-code form below. As with the pseudo-code discussed above which may be used to load a profiler agent library to the memory of an existing process, the pseudo-code below is provided for illustrative purposes only. It should appreciated that any suitable programmed procedure may be employed, as the invention is not limited in this respect.

```
DWORD ExecuteHijackLoadLibrary(pData)
{
    SetDefaultValuesOfReturnData(pData);
    //
    // Load Library
    //
    pData->fnLoadLibraryW(pData->ModuleName);
    if(SUCCESS)
    {
        UpdateValuesOfReturnData(pData);
    }
Synchronization:
    event = pData->fnCreateEvent(pData->EventName);
    SetEvent(event);
SelfBlock:
    while(1)
        ;
    return 1; // required for compilation, but we never get there
}
```

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. In a system which includes a target application, a profiler application and a debugging application, the profiler application being operative to attach to the target application and, upon attaching to the target application, performing operations to profile the target application, the debugging application being operative to monitor the target application, a method comprising acts of:
   (A) causing the profiler application to attach to the target application such that instructions executed by the profiler application to profile the target application are susceptible to monitoring by the debugging application;
   (B) causing the profiler application to execute one or more instructions to profile the target application; and
   (C) causing the debugging application to debug the one or more instructions executed by the profiler application;
   wherein the profiler application attaches to the target application in part by loading a profiler agent library to memory used by the target application, and wherein the act (A) further comprises:
   (A1) generating helper code;
   (A2) transferring the helper code to the memory used by the target application; and (A3) causing the helper code to be executed from the memory used by the target application, wherein the helper code, when executed, causes the profiler agent library to be loaded to the memory used by the target application.

2. The method of claim 1, wherein, at the time the act (A) is begun, the target application is executing.

3. The method of claim 2, wherein the system further includes an operating system which administers the execution of the target application and the profiler application, wherein the operating system provides for an execution of multiple process threads, and wherein the act (A3) further comprises initiating, by the profiler application, a remote thread to cause the helper code to be executed from the memory used by the target application.

4. The method of claim 2, wherein the act (A1) further comprises generating helper code which employs at least one library, and wherein each of the libraries is loaded to a same memory region by each process which employs the at least one library.

5. The method of claim 1, wherein, at the time the act (A) is begun, the target application has not been initiated.

6. The method of claim 5, wherein the system further includes an operating system which administers the execution of the target application and the profiler application, wherein the operating system provides for an execution of multiple process threads, wherein the act (A2) further comprises initiating the target application in suspended mode having a process thread, and wherein the act (A3) further comprises determining a context for the process thread, modifying the context to include a pointer to the location of the helper code, and causing the target application to resume such that the process thread executes the helper code.

7. The method of claim 6, wherein the process thread is the only process thread of the target application, and wherein the helper code is configured to, upon causing the profiler agent library be loaded to the memory used by the target application, block itself into an endless loop, such that the target application is not terminated by the operating system.

8. The method of claim 6, further comprising acts, performed after the completion of the act (A3), of:

(A4) resetting the context of the process to the context which was determined in the act (A3); and (A5) resuming the thread to process according to the reset context.

9. In a system comprising a target application, a profiler application comprising at least one profiler agent, and a debugging application, the profiler application being operative to attach to the target application and, upon attaching to the target application, performing operations to profile the target application, the target application having memory allocated thereto for execution, the debugging application being operative to monitor the target application, at least one computer-readable storage medium having instructions recorded thereon, the instructions, when executed, performing a method comprising acts of:

(A) attaching, by the profiler application, to the target application such that instructions executed by the profiler application to profile the target application are susceptible to monitoring by the debugging application, the attaching comprising loading a profiler agent to the memory allocated to the target application;

(B) causing the profiler application to execute one or more instructions to profile the target application; and (C) causing the debugging application to debug the one or more instructions executed by the profiler application;

wherein the act (A) further comprises:

(A1) generating helper code;

(A2) transferring the helper code to the memory allocated to the target application; and (A3) causing the helper code to be executed from the memory used by the target application, wherein the helper code, when executed, causes the profiler agent to be loaded to the memory allocated to the target application.

10. The at least one computer-readable storage medium of claim 9, wherein, at the time the act (A) is begun, the target application is executing.

11. The at least one computer-readable storage medium of claim 10, wherein the system further includes an operating system which administers the execution of the target application and the profiler application, wherein the operating system provides for an execution of multiple process threads, and wherein the act (A3) further comprises initiating, by the profiler application, a remote thread to cause the helper code to be executed from the memory used by the target application.

12. The at least one computer-readable storage medium of claim 10, wherein the act (A1) further comprises generating helper code which employs at least one library, and wherein each of the libraries is loaded to a same memory region by each process which employs the at least one library.

13. The at least one computer-readable storage medium of claim 9, wherein, at the time the act (A) is begun, the target application has not been initiated.

14. The at least one computer-readable storage medium of claim 13, wherein the system further includes an operating system which administers the execution of the target application and the profiler application, wherein the operating system provides for an execution of multiple process threads, wherein the act (A2) further comprises initiating the target application in suspended mode having a process thread, and wherein the act (A3) further comprises determining a context for the process thread, modifying the context to include a pointer to the location of the helper code, and causing the target application to resume such that the process thread executes the helper code.

15. The at least one computer-readable storage medium of claim 14, wherein the process thread is the only process thread of the target application, and wherein the helper code is configured to, upon causing the profiler agent be loaded to the memory used by the target application, block itself into an endless loop, such that the target application is not terminated by the operating system.

16. The at least one computer-readable storage medium of claim 14, further comprising acts, performed after the completion of the act (A3), of:

(A4) resetting the context of the process to the context which was determined in the act (A3); and (A5) resuming the thread to process according to the reset context.

* * * * *